No. 786,089. PATENTED MAR. 28, 1905.
E. W. BENNETT, DEC'D.
D. CLARK, ADMINISTRATOR.
APPARATUS FOR DIPPING ANIMALS.
APPLICATION FILED AUG. 24, 1903.
3 SHEETS—SHEET 2.
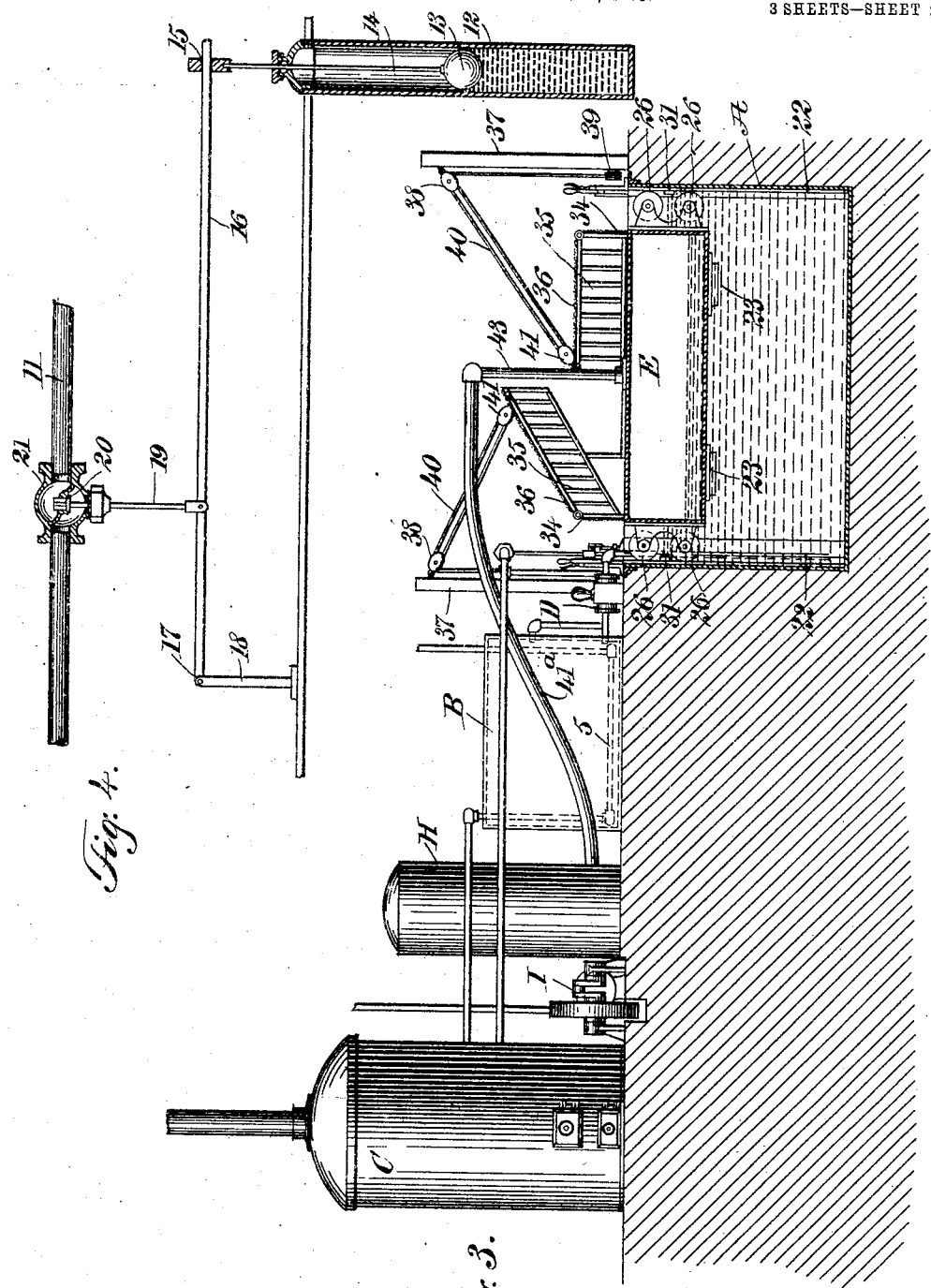

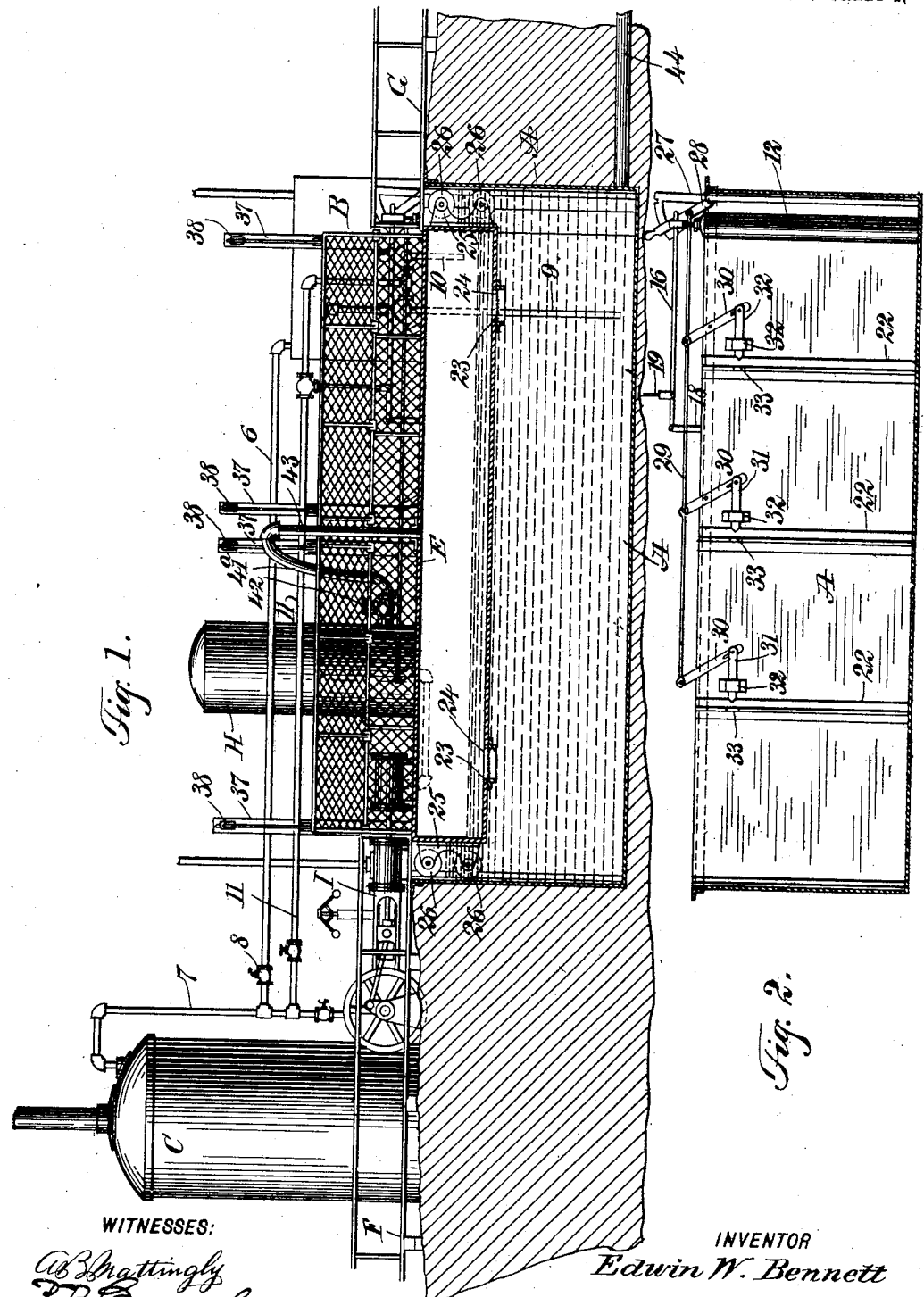

No. 786,089. PATENTED MAR. 28, 1905.
E. W. BENNETT, DEC'D.
D. CLARK, ADMINISTRATOR.
APPARATUS FOR DIPPING ANIMALS.
APPLICATION FILED AUG. 24, 1903.
3 SHEETS—SHEET 3.
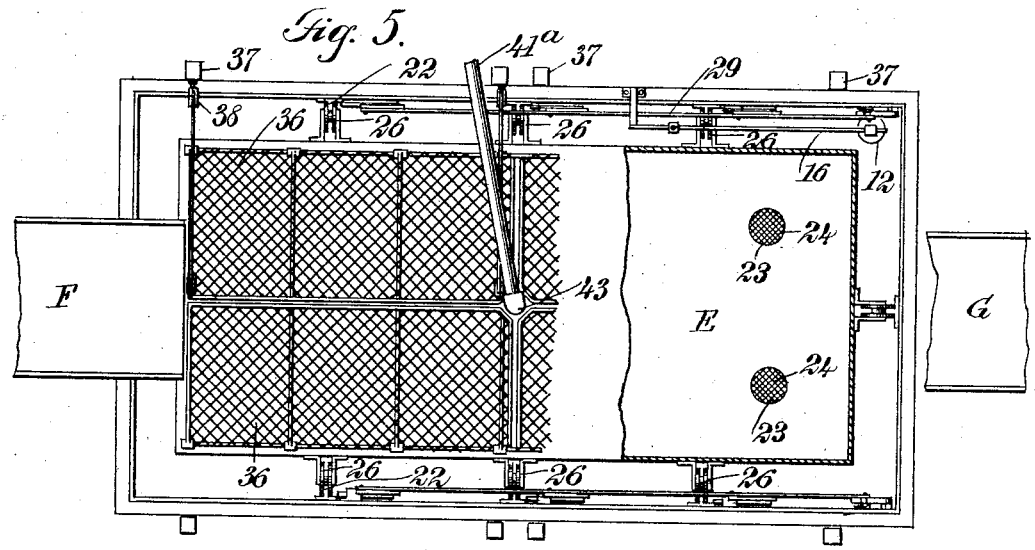
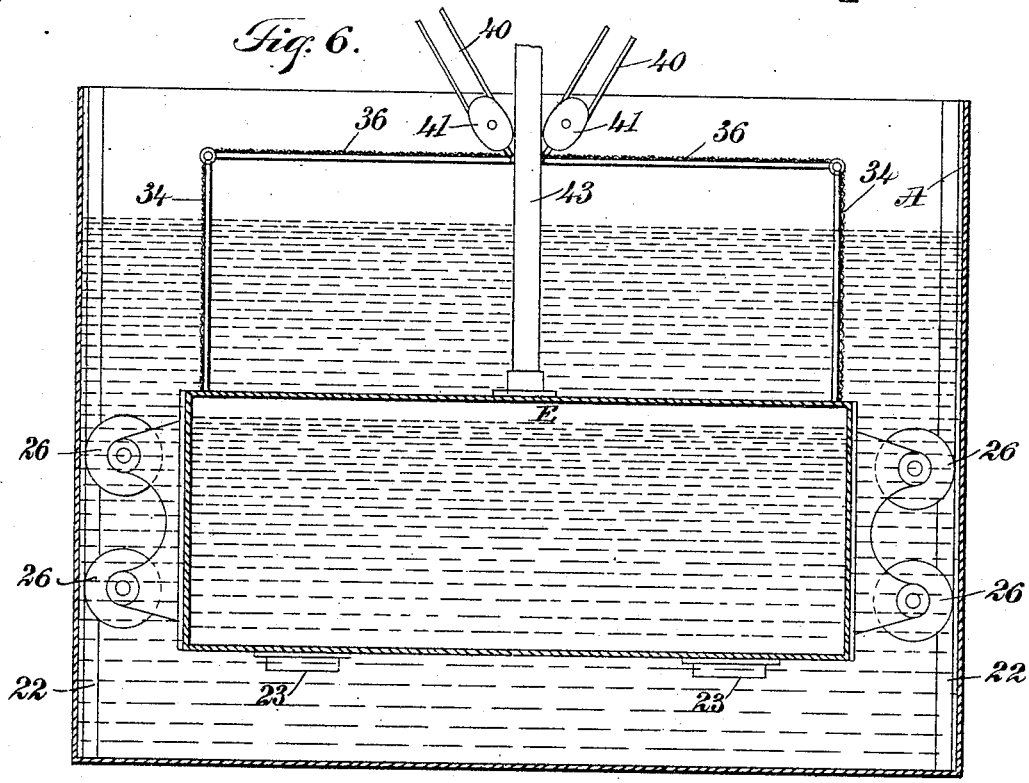
WITNESSES:
INVENTOR
Edwin W. Bennett
BY
ATTORNEYS No. 786,089. Patented March 28, 1905.

UNITED STATES PATENT OFFICE.

EDWIN W. BENNETT, OF RAWLINS, WYOMING; DUNCAN CLARK ADMINISTRATOR OF SAID EDWIN W. BENNETT, DECEASED.

APPARATUS FOR DIPPING ANIMALS.

SPECIFICATION forming part of Letters Patent No. 786,089, dated March 28, 1905.

Application filed August 24, 1903. Serial No. 170,584.

*To all whom it may concern:*

Be it known that I, EDWIN W. BENNETT, a citizen of the United States, and a resident of Rawlins, in the county of Carbon and State of Wyoming, have invented a new and Improved Apparatus for Dipping Animals, of which the following is a full, clear, and exact description.

This invention relates to certain novel and useful improvements in an apparatus for immersing or dipping animals in a cleansing solution.

In carrying out my invention I have particularly in view as an object the construction of an apparatus through the medium of which the animals may be quickly and easily immersed in the bath and with perfect safety, as the method commonly employed by ranchmen and cattle-owners of forcing the animals to jump into the solution, at the risk of broken bones and other serious injury, is obviated.

A further object in contemplation is the provision of means by which the animals may be lowered into and removed from the bath, combined with novel means for locking the platform on which the animals stand while being subjected to treatment.

Another important object of my improvement is to keep the cleansing solution at a certain temperature, this being accomplished by removing from the immersion-tank the solution which has cooled therein and supplying a heated solution to such tank.

With the above-recited objects and others of a similar nature in view my invention consists in the construction, combination, and arrangement of parts, as is described in this specification, delineated in the accompanying drawings, and set forth in the appended claims.

Reference is to be had to the accompanying drawings, forming a part of this specification, in which similar characters of reference indicate corresponding parts in all the figures.

Figure 1 is a view, mainly in side elevation, of an apparatus embodying my improvements, the solution-tank and movable platform therein being shown in section. Fig. 2 is a sectional view of the solution-tank and the mechanism employed for locking the movable platform within said tank. Fig. 3 is an end view of my improved apparatus, the solution-tank and platform being shown in transverse section, such view also showing the manner of raising and lowering the platform-gates. Fig. 4 is a view of a portion of the steam-pipe leading to the solution-heating tank and the mercury-valve of said pipe. Fig. 5 is a top view of the solution-tank and platform, the gates of the platform being shown in their closed position, a portion of said platform being broken away to show the openings in the bottom thereof; and Fig. 6 is a vertical longitudinal sectional view taken through the solution-tank and platform.

Referring now to the accompanying drawings in detail, A designates a tank or vat, of any desired size and construction, set in an excavation or foundation in the ground so that the upper edge portion of the tank is approximately on a level with the surface of the ground. This tank is adapted to have a heated cleansing solution supplied thereto from a receptacle B, which for the sake of convenience and clearness will be hereinafter termed the "heating-chamber." The solution is first placed in the heating-chamber and brought to the desired temperature by a heating-coil 5, arranged at the bottom thereof, which coil is connected by a steam-pipe 6 with the main feed-pipe 7, leading from the boiler C. An ordinary valve 8 is used to regulate the passage of the steam into the heating-coil. From the chamber B the heated solution is forced by a pump D, through the tube 9, into the tank, while the solution which has cooled in such tank is forced back by the pump, through the pipe 10 into the chamber B, where it is reheated by the steam-coils.

The pump D is driven through steam from the boiler C, a pipe 11, connected with the main feed-pipe 7, supplying steam to the cylinder of the pump, the admission of steam to start the pump being controlled in the following manner:

Within the solution-tank is arranged a vertical cylinder 12, designed to be partially filled with mercury. A float-ball 13, lying within said cylinder, has its stem 14 connected, as at 15, with the lever 16, the latter in turn being pivoted at 17 to the standard 18, arranged alongside the tank. Pivotally connected to the lever 16 is the rod 19 of a valve 20, said latter valve lying within a globe-casing 21 and the steam-pipe line 11.

The construction and operation of the device will be apparent. As the water in the tank cools the mercury and the ball 13 sink in the cylinder, therefore pulling down the lever 16 and opening the valve of the steam-pipe 11 to admit steam into the pump D, which then forces the warm solution from the heating-chamber into the tank through the pipe 9 and by suction removes the cold solution from the tank to the heating-chamber through the pipe 10.

Within the tank A and at opposite sides thereof are arranged vertical tracks or guideways 22, said guides being substantially in the shape of T-beams. Upon these, as guide-rods, is adapted to move the platform of the apparatus, upon which platform the animals to be immersed are placed. This platform, which I have designated as an entirety by the letter E, comprises a long box-like structure which is practically air-tight—that is to say, the only openings therein are the orifices 23 23 in the bottom thereof, which openings are each covered with a screen, as at 24 24. At the sides of the platform are arranged a number of brackets 25, each carrying a pair of grooved rollers 26, the members of each pair being spaced apart. The rollers of each pair move along one of the guide-bars 22 as the platform rises or falls in the tank, and in order to lock the platform against movement within the tank and approximately level with the top thereof I employ the following mechanism: Secured to the upper edge portion of the tank is a locking-segment 27, having pivoted thereto the lever 28, designed to engage with notches formed in the said segment. To this lever is connected one end of the relatively long rod 29, which extends approximately parallel with the upper edge of the tank, while pivoted to the side of the tank are a number of bars 30, one bar for each guide 22, each of said bars being connected at its upper end portion with the rod 29. At the lower end of each bar is fastened a locking-latch member 31, slidable in a small guide-clip 32, arranged adjacent to each guide 22. When the platform is in its normal position—that is to say, having its upper surface approximately in the same horizontal plane as the upper edge of the tank—it may be locked in such position by drawing the hand-lever outward from the tank, which movement will thrust the latch members through the slots 33 in the guides and between the members of each pair of rollers. This manner of locking the platform stationary is clearly shown in Fig. 2. It is intended that the animals to be subjected to the bath should be placed upon this platform, and in order to provide for their safety by preventing them from leaving the platform during the process of washing I have arranged along each side of the platform a latticed fence or railing, as at 34 34. At each end of each rail is pivoted an end gate 35, the end gates of the same rail being connected by and supporting a latticed foraminous top, as at 36, the construction and combination of the sides, ends, and top being such that the cage-like members are carried by the platform. In order to raise each top and its connected end gates, I have erected adjacent to the tank a number of standards or posts, as shown at 37 37, each carrying pulleys 38 and 39, over which pulleys run ropes or cables 40 40, these latter also passing through the pulleys 41 41, secured to the tops 36 36 of the cage-like members. By this arrangement the gates and top may be raised to permit the animals to pass down the runways F and G into or off the float. When the animals have taken their places on the platform, the cage-like members are lowered, as seen in Figs. 1, 5, and 6, and the platform is lowered by exhausting air from the platform, which permits water to rise in the interior through the openings 23 23, this, combined with the weight of the animals, causing the platform to sink.

When the animals have been in the bath a sufficient length of time to obtain the desired result, the platform may be raised to its normal position in the following manner: Arranged adjacent to the boiler C is a compressed-air-storage tank H, adapted to have air forced therein from the compressor-engine I, which engine is driven by steam conveyed thereto through the main feed-pipe 7 of the boiler. Leading from the air-tank H is a flexible tubing $41^a$, having therein a valve-cock 42 for controlling the flow of air from the tank. This tubing $41^a$ is connected with a tube 43, arranged approximately centrally of the platform and communicating with the interior thereof. When the platform has been immersed a sufficient length of time or to the proper depth, the valve 42 is turned to admit air into the interior of the platform, which forces the water therefrom out through the openings 23 and causes the platform to rise to the surface. The air may be then shut off and the platform locked, as hereinbefore described. It is also to be noted that the distance to which the platform-float descends may be regulated by the compressed-air apparatus, for as soon as the tank has been submerged to a desired point the air may be admitted in a sufficient quantity to sustain the platform in such position.

To empty or withdraw a part or all of the solution from the tank, an outlet-pipe, as at 44, is connected therewith and leads off to any suitable point of discharge.

From the above description, taken in connection with the accompanying drawings, the construction and operation of my improved apparatus will be readily understood and its numerous advantages appreciated.

Completeness in the treatment of the animals is secured by means of the submerging of the platform, which latter is so controlled by the operator that it may be gradually lowered into the solution-tank, allowing the solution to act in a thorough and efficient manner.

By means of the mercurial governor acting on the steam-valve the solution is kept at any desired temperature, while the control of the operator over the apparatus is such that the tank may be kept submerged any length of time or instantly raised, so that danger from suffocation or drowning is obviated, while the operation of immersing the animals may be performed with a great saving of time over the old method hereinbefore mentioned.

While I have herein described and shown one particular embodiment of my invention, I wish it to be understood that I do not confine myself to all the details of construction recited, as there may be modifications and variations in some respect without departing from the essence of the invention or sacrificing any of the advantages thereof.

Having thus described my invention, I claim as new and desire to secure by Letters Patent—

1. An apparatus comprising a tank designed to contain a solution, a hollow platform movable in said tank, an air-storage tank, a tubular connection between the air-tank and the hollow platform for supplying air to said platform, a heating-chamber communicating with the tank, a heater in said chamber, a steam-generator, means for conducting steam from the generator to the heater, a pump for forcing heated solution from the heating-chamber to the solution-tank and the cooled solution from the tank to the chamber, a steam-pipe leading from the generator to the pump for operating the latter, and a mercurial governor-valve for said steam-pipe designed to regulate the steam admitted to the pump.

2. The combination of a solution-containing tank, a platform movable therein, guide-rollers carried by said platform, and means adapted to be thrust between certain of said rollers for locking the platform stationary within the tank.

3. The combination of a solution-containing tank, means for supplying a heated solution thereto, means for removing solution from the tank, a support movable within the tank, and means including a lever-operated latching device for locking the support against movement.

4. The combination of a tank designed to contain a solution, a hollow platform movable therein and having openings in one of the faces thereof whereby the solution may enter the platform to assist in sinking the same, means for forcing air into the platform for raising the latter, and means for locking the platform against movement, said means including a lever, a relatively long sliding rod connected to said lever and latch-bars connected with said rod.

5. The combination of a solution-containing tank, a platform movable therein, rollers carried by the platform, and means for locking the platform stationary in said tank, such means including a lever-operated latching device adapted to be interposed between certain of said rollers.

6. An apparatus comprising a tank, a platform movable therein, vertically-arranged tracks forming guideways secured to the side walls of said tank, rollers carried by the platform and adapted to engage said guideways for directing the movement of the platform within the tank, pneumatic mechanism for raising said platform by the buoyancy of air forced thereinto, and a lever-operated latching device for locking the platform against movement.

7. An apparatus comprising a solution-containing tank, a hollow platform movable therein and having openings for the admission of a solution to the interior of the platform when the latter is submerged, an air-storage tank, a tube on the top of the hollow platform and communicating with the interior thereof, a flexible valve-controlled tubing between the air-tank and the tube on said platform for conducting air to the platform, thereby causing said air to displace said solution within said hollow platform, and inclosing mechanism mounted upon said platform.

8. An apparatus comprising a solution-containing tank, a platform movable therein and adapted to be submerged in a solution, movable gate members for said platform, means for raising and lowering said gate members, and mechanism for supplying air to the interior of the platform.

9. The combination of a solution-containing tank, a platform disposed therein and movable relatively thereto, a heating-chamber disposed adjacent to the tank and adapted to supply a heated solution thereto, means for returning said solution from the tank to the heating-chamber, and means for admitting air to said platform for the purpose of raising the same.

10. The combination of a tank adapted to contain a solution, a hollow platform adapted to be submerged in said solution, a heated chamber communicating with said tank and adapted to supply a solution thereto, means for returning the solution from the tank to the heating-chamber, a heating-coil disposed within said chamber, means for supplying steam to said coil, mechanism for supplying air to the hollow platform, thus causing the same to partially emerge from the general body of said solution, and means for locking said platform against movement.

11. The combination of a tank adapted to contain a solution, a platform disposed within said tank and movable relatively thereto, means for guiding movements of said platform within said tank, mechanism for locking the platform against movement, inclosing gates mounted upon said platform and movable relatively thereto, means for heating a solution supplied to said tank, and mechanism for returning said solution from said tank to its source of supply.

12. The combination of a tank adapted to contain a solution, a hollow platform disposed within said tank and movable relatively thereto, hinged inclosing gates for said platform, a chamber disposed adjacent to said tank and adapted to supply a solution thereto, a heater for the liquid contained in said chamber, a steam-generator, means for conducting steam from the generator to the heater, mechanism for supplying air to the platform to raise the same relatively to said tank, means for removing air from the platform to lower the same relatively to said tank, and mechanism for locking the platform against movement.

13. The combination with a tank adapted to contain a solution, of a hollow platform movable in said tank, an air-storage tank, a tubular connection between the air-tank and the hollow platform for supplying air to said platform, a heating-chamber communicating with said tank for supplying the solution thereto, means for heating the solution in the heating-chamber, means for forcing the heated solution from the heating-chamber to the said solution-tank, and the cooled solution from the tank to the heating-chamber, and a controlling device for said means.

In testimony whereof I have signed my name to this specification in the presence of two subscribing witnesses.

EDWIN W. BENNETT.

Witnesses:
   HOMER MERRELL,
   G. M. HUNTINGTON.